Patented Dec. 3, 1940

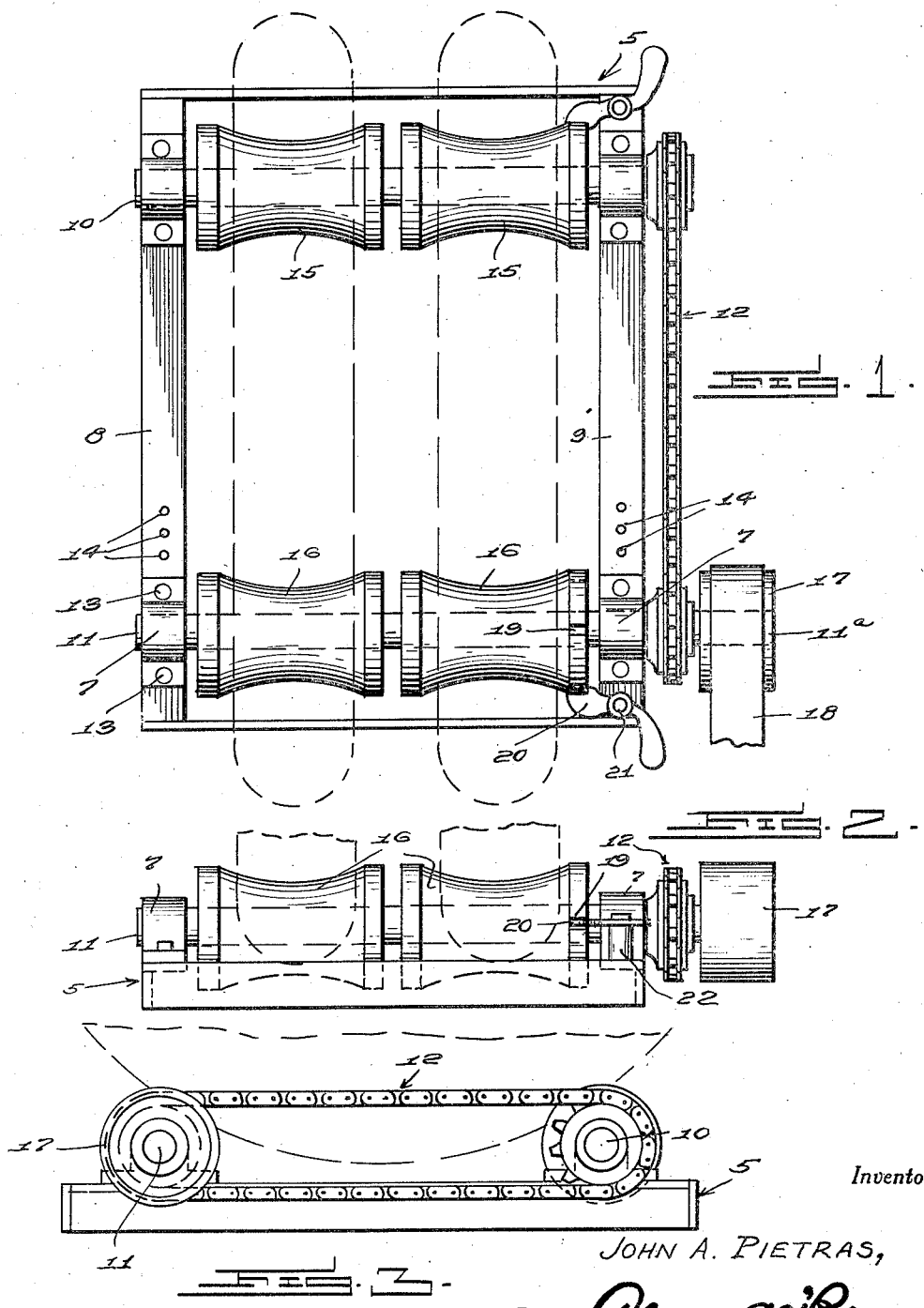

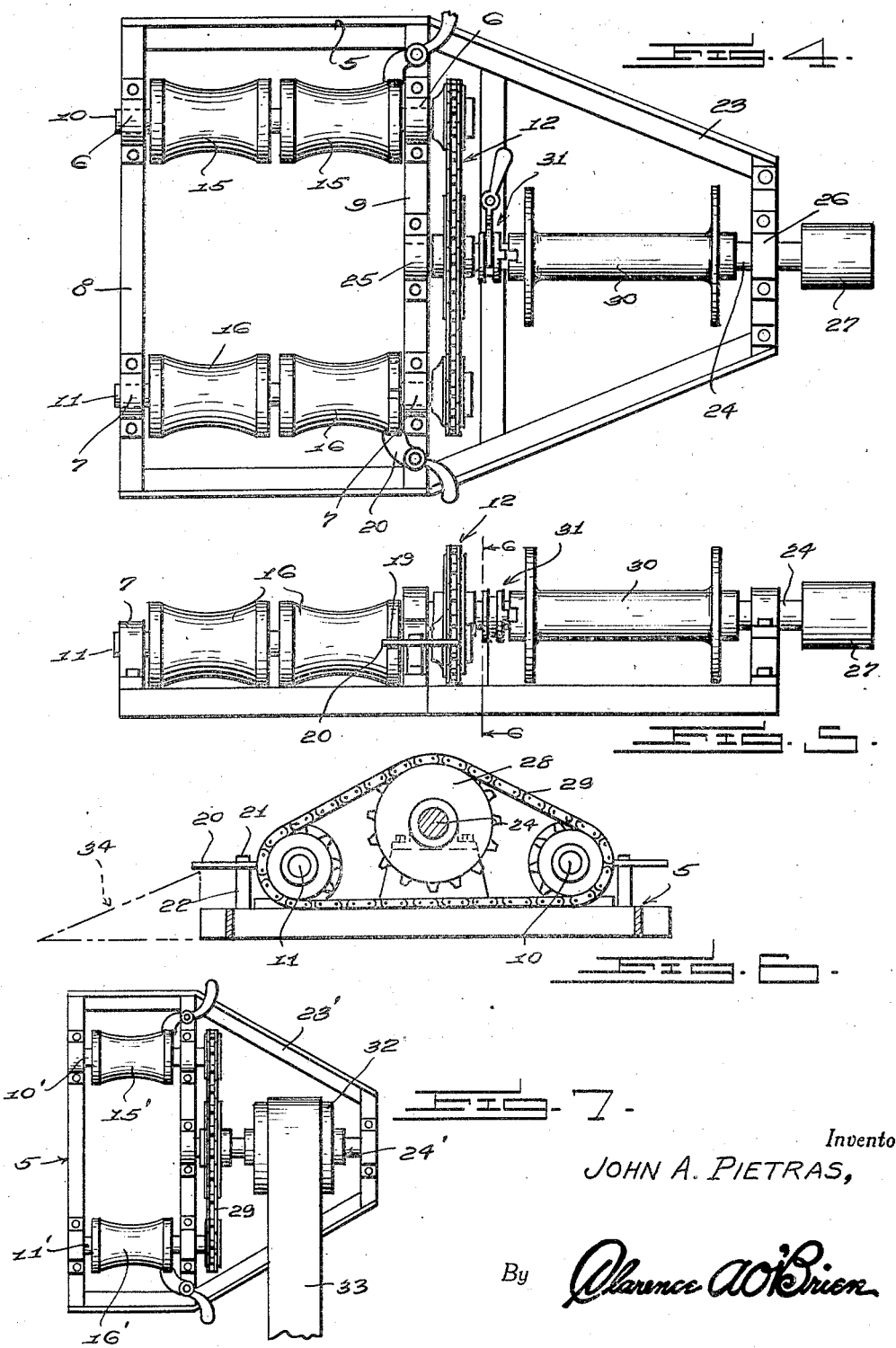

2,223,899

UNITED STATES PATENT OFFICE 2,223,899

POWER UNIT

John A. Pietras, Waukesha, Wis., assignor of one-fourth to Raymond J. Buettner, West Allis, Wis.

Application June 1, 1940, Serial No. 338,411

1 Claim. (Cl. 74—14)

This invention relates to what may be termed a power unit; one of the objects of the invention being the provision of an improved device of the type now generally employed for transmitting power from the drive wheels of a motor vehicle to any suitable type of work to be driven, such as for example a winch or the like; while another object of the invention is to provide a device of this character characterized by simplicity of construction and economy of parts so that the same may be employed with equal facility either as a stationary unit or as a unit mounted on a truck body to be readily swung in position to be engaged with the driving wheels of the vehicle, and as may be found desirable.

The invention together with its objects and advantages will be best understood from a study of the following description taken in connection with the accompanying drawings wherein:

Figure 1 is a plan view showing one form of the invention.

Figure 2 is an end elevational view thereof.

Figure 3 is a side elevational view of the unit.

Figure 4 is a top plan view illustrating a slightly modified form of the invention.

Figure 5 is a side elevational view of the form of the invention shown in Figure 4.

Figure 6 is a detail view taken substantially on the line 6—6 of Figure 5, and

Figure 7 is a plan view of a third form of the invention.

Referring more in detail to the drawings it will be seen that in each form disclosed the invention embodies a suitable frame 5, opposed pairs of bearings 6 and 7, respectively, mounted on the longitudinal members 8 and 9, respectively; the respective pairs of bearings supporting shafts 10 and 11, and the shafts at one end connected by a suitable transmission connection indicated generally by the reference numeral 12.

Also, and as shown in Figure 1, one set of bearings, for example the bearings 7, are secured at the desired position of adjustment relative to the second set of bearings, namely the set of bearings 6, through the medium of bolts or other fastening elements 13 engageable with selected openings of longitudinal series of openings 14 provided in the respective frame bars 8 and 9.

It will also be seen that in each form of the invention the drive connection between the shafts is in the form of a chain and sprocket connection, the shafts on one end being equipped with suitable sprockets over which an endless chain is trained as shown.

In the form of the invention shown in Figure 1 both of the shafts 10 and 11 are equipped with a pair of rollers, 15 and 16 respectively, the rollers being fast to their respective shafts to rotate therewith.

By equipping each shaft with a pair of rollers it will be apparent that the device may be used with motor vehicles equipped with dual wheels, such as trucks, busses and the like, the sections of the dual wheel engaging the rollers as suggested by broken lines in Figure 1 for transmitting drive from the wheel to the shafts 10 and 11.

Also in accordance with the present invention either one of the shafts 10 and 11, in the present instance shaft 11, has an extended end 11a on which is mounted a pulley 17 about which is trained a drive belt 18, the latter to be trained about a similar pulley associated with the work to be driven, such as a concrete mixer, feed grinder, or the like.

Also, and as shown, in each form of the invention at least one of the shaft-mounted rollers is equipped at one end thereof, and in the periphery thereof with a circular series of notches such as shown best in Figure 1 and indicated by the reference numeral 19, and adapted to be engaged in a selected one of the notches for holding the rotary parts of the unit against casual rotation is a handle-equipped dog 20, the same being pivotally mounted as at 21 on a post 22 rising from the frame at one corner thereof.

In the form of the invention shown in Figure 7 each of the shafts, therein indicated by the reference numerals 10' and 11', respectively, is provided with a single roller 15' and 16' respectively.

In each of the forms of the invention shown in Figures 4 and 7, respectively, the main frame 5 has extending from one longitudinal side thereof an extension frame 23 (in Figure 4) to accommodate a power take-off shaft 24, the same being journaled in bearings 25 and 26, respectively, as shown.

On one end thereof the shaft 24 is equipped with a pulley 27 over which a drive belt may be trained for transmitting drive from the shaft 24 to the desired work. At the other end thereof the shaft 24 is equipped with a sprocket 28 disposed between the runs of the endless chain therein indicated by the reference numeral 29 so that drive from the roller-equipped shaft is transmitted to the power take-off shaft 24 for driving the latter.

Also in the form of the invention shown in Figure 4 there is mounted on the power take-off shaft 24 a drum 30 for use in winding a cable or the like thereon and for placing the shaft 24 into and out of driving engagement with the drum 30 there is provided a suitable manually operated clutch mechanism 31.

In the form of the invention shown in Figure 7 the power take-off shaft therein illustrated and indicated by the reference numeral 24' has mounted thereon, and within the confines of the extension frame, therein indicated by the reference numeral 23', a pulley 32 over which is trained a belt 33 for transmitting drive from the shaft 24' to the work.

One manner of using the device may be briefly explained as follows:

The device as shown in Figure 1, for example, may be placed so that the rollers 15 and 16 thereof will be in alignment with the sections of a dual drive wheel of a vehicle. The vehicle is then backed so that the sections of said dual wheel will engage the rollers 15 and 16 in the manner suggested by broken lines in Figures 1 to 3 inclusive. When this position is reached drive, in the usual manner, is transmitted from the motor of the vehicle to the drive wheel thereof and the frictional contact between the sections of the wheel and the rollers 15 and 16 will be such as to cause the shafts 10 and 11 to rotate, and drive, in this instance from the shaft 11, will be transmitted through the pulley 17 and belt 18 to the work, be it a feed grinder, concrete mixer, or whatever the character and nature of the work may be.

Each of the other forms of the invention is, as is obvious, used in substantially the same manner, and as suggested in Figure 6, a suitable runway illustrated in said figure by broken lines and indicated generally by the reference numeral 34 may be employed to guide the wheel of the vehicle onto the rollers of the unit.

It is thought that a clear understanding of the construction, manner of use, and advantages of a unit of this character will be had without a more detailed description.

Having thus described the invention what is claimed as new is:

A power take-off device comprising a horizontal frame, including a pair of side members, two pairs of bearing members connected with the upper faces of the side members, one pair being arranged adjacent one end of the frame and the other pair adjacent the other end of the frame, a shaft rotatably arranged in each pair of bearing members, rollers attached to the shaft and each roller having an annular groove therein, said rollers adapted to be placed in frictional engagement with the periphery of a wheel of a motor vehicle, said rollers having cylindrical-shaped ends with transversely extending notches in those cylindrical ends which are located adjacent one of the side members, posts rising from the said side member, a dog pivoted to each post and having a handle at its outer end, said dogs adapted to engage some of the notches for holding the rollers against rotary movement, said handles extending outwardly from the side member when the dogs are engaging the notches with the posts located at the ends of said side member, a sprocket on each shaft and an endless chain passing over the sprockets.

JOHN A. PIETRAS.